United States Patent
Shinada (10) Patent No.: US 7,383,121 B2
(45) Date of Patent: Jun. 3, 2008

(54) OPTICAL COMMUNICATION EQUIPMENT AND VEHICLE CONTROL METHOD

(75) Inventor: Akira Shinada, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/004,929

(22) Filed: Dec. 7, 2004

(65) Prior Publication Data

US 2005/0137782 A1 Jun. 23, 2005

(30) Foreign Application Priority Data

Dec. 17, 2003 (JP) .......................... P2003-419339

(51) Int. Cl.
*G08G 1/0965* (2006.01)
*G08G 1/0967* (2006.01)

(52) U.S. Cl. ..................... 701/117; 701/1; 340/905

(58) Field of Classification Search ............... None
See application file for complete search history.

(56) References Cited

U.S. PATENT DOCUMENTS

| | | | | |
|---|---|---|---|---|
| 5,126,735 | A * | 6/1992 | Trevijano | 340/902 |
| 5,428,544 | A * | 6/1995 | Shyu | 701/117 |
| 5,635,920 | A * | 6/1997 | Pogue et al. | 340/901 |
| 5,904,215 | A * | 5/1999 | Ikeda | 180/169 |
| 6,765,495 | B1 * | 7/2004 | Dunning et al. | 340/903 |
| 2002/0198653 | A1 | 12/2002 | Lutter | |
| 2005/0187701 | A1 * | 8/2005 | Baney | 701/117 |

FOREIGN PATENT DOCUMENTS

| | | |
|---|---|---|
| DE | 199 15 935 A1 | 10/2000 |
| EP | 0 330 165 | 8/1989 |
| JP | 06-295398 | 10/1994 |
| JP | 09-050595 | 2/1997 |
| JP | 11-306489 | 11/1999 |
| JP | 2000-222684 | 8/2000 |
| JP | 2001-153951 | 6/2001 |
| JP | 2001-167384 | 6/2001 |
| JP | 2002-024991 | 1/2002 |
| JP | 2002-202741 | 7/2002 |
| NL | 1 007 288 C2 | 4/1999 |
| WO | WO 02/27347 A2 | 4/2002 |

* cited by examiner

*Primary Examiner*—Michael J. Zanelli
(74) *Attorney, Agent, or Firm*—Rader Fishman & Grauer PLLC; Ronald P. Kananen (57) ABSTRACT

The present invention relates to optical communication equipment and a vehicle control method, and in particular, the present invention is applied to a system utilizing inter-vehicle communication equipment via optical communication to notify information of traffic regulation utilizing optical communication according to an inter-vehicle communication system so that traveling of a vehicle can be controlled easily and reliably even in such a complicated place where a plurality of roads intersect as in urban cities or the like.

12 Claims, 4 Drawing Sheets

| CONTENTS OF TRANSMISSION | ACTION |
|---|---|
| SPEED LIMIT | SET SPEED LIMIT TO UPPERMOST OR LOWERMOST SPEED |
| TRAFFIC DIRECTION CONTROL | DECELERATE |
| NO U-TURNS | STOP STEERING ASSIST AGAINST LARGE STEERING WHEEL OPERATION |

OPTICAL COMMUNICATION EQUIPMENT AND VEHICLE CONTROL METHOD

CROSS REFERENCES TO RELATED APPLICATIONS

The present document is based on Japanese Priority Document JP 2003-419339, filed in the Japanese Patent Office on Dec. 17, 2003, the entire contents of which being incorporated herein by reference.

BACKGROUND OF THE INVENTION

1. Field of the Invention

The present invention relates to optical communication equipment and a vehicle control method, and in particular, it relates to a system utilizing inter-vehicle communication equipment via optical communication. By arranging to notify information of traffic regulations utilizing optical communication according to the inter-vehicle communication system, it is enabled by the present invention to control traveling of a vehicle easily and reliably even in such a complicated place where a plurality of roads intersect as in urban cities or the like.

2. Description of Related Art

Conventionally, as a method for improving safe driving of a vehicle, for example, Japanese Patent Application Publication (KOKAI) Nos. 2001-167384 and Hei 9-50595, etc. have proposed methods to control traveling speed and so on in accordance with data transmission by radio from equipment installed in a road sign or the like. According to these methods, because the traveling of a vehicle ignoring a traffic regulation can be prevented, it is considered that traffic safety is improved accordingly.

According to these methods, however, there are such problems that because dedicated facilities must be installed along the road and installed in a vehicle, its system inevitably becomes large-scaled. Further, because it depends on data transmission by radio, even if a frequency band having strong directivity is employed, it is difficult to control the traveling of only a specific vehicle traveling in a specific area, thereby it is not applicable to a place where a plurality of roads intersect in complication such as in urban cities or the like.

[Patent Document 1] Japanese Patent Application Publication (KOKAI) No. 2001-167384

[Patent Document 2] Japanese Patent Application Publication (KOKAI) No. Hei 9-50595

SUMMARY OF THE INVENTION

The present invention is contemplated to solve the aforementioned problems, and it proposes a novel optical communication system and a novel vehicle control method that ensures for the traveling of a vehicle to be controlled easily and reliably even in such a complicated area where a plurality of roads intersect as in an urban city or the like.

In order to solve the aforementioned problems, according to an aspect of the present invention, there is provided optical communication equipment for controlling traveling of a vehicle by notifying information of traffic regulations to the vehicle and inter-vehicle communication equipment installed in the vehicle for transmitting/receiving various information to and from similar equipment installed in another vehicle via optical communication, wherein the optical communication equipment transmits information of traffic regulations so as to be receivable by the inter-vehicle communication equipment.

Further, according to another aspect of the present invention, optical communication equipment installed in a vehicle is provided, comprising: a light emitter for emitting a light to be used in optical communication; an encoder for operating the light emitter; a light receiver for receiving a light of communication from similar equipment installed in another vehicle; a decoder for decoding a result of light reception by the light receiver; and a controller for processing a result of decoding by the decoder and for controlling the operation of the encoder, wherein the controller controls the encoder in response to an operation by a user to transmit a desired message via optical communication, and if the result of decoding by the decoder is the one via optical communication from similar equipment installed in another vehicle, the controller controls the result of the decoding to be notified to the user, and if the result of decoding by the decoder pertains to information of traffic regulations, the controller controls the traveling of the vehicle in accordance with the result of the decoding.

According to still another aspect of the invention, a vehicle control method for controlling traveling of a vehicle by notifying information of traffic regulations to the vehicle is provided, comprising the step of transmitting information of traffic regulations so as to be receivable by inter-vehicle communication equipment installed in a vehicle for transmitting/receiving various information to and from similar equipment installed in another vehicle by optical communication.

According to the arrangement of the preferred embodiment of the present invention, it is possible to supply or obtain information of traffic regulations by utilizing the system and facilities associated with the inter-vehicle communication equipment, thereby enabling to construct a system having a simple overall configuration accordingly. Further, because the information of traffic regulations is supplied via optical communication, it becomes possible, by effectively utilizing the optical property, to reliably supply specific information of traffic regulations corresponding to a specific vehicle traveling through a specific area even in an urban city or the like where a plurality of roads intersect in complication. Thereby, even in such a place where a plurality of roads intersects in complication such as in an urban city or the like, the traveling of the vehicle can be controlled easily and reliably.

DESCRIPTION OF PREFERRED EMBODIMENTS

By referring to the accompanying drawings, preferred embodiments of the present invention will be described in detail.

Embodiment 1

(1) Configuration of Embodiment 1

Figure 1:
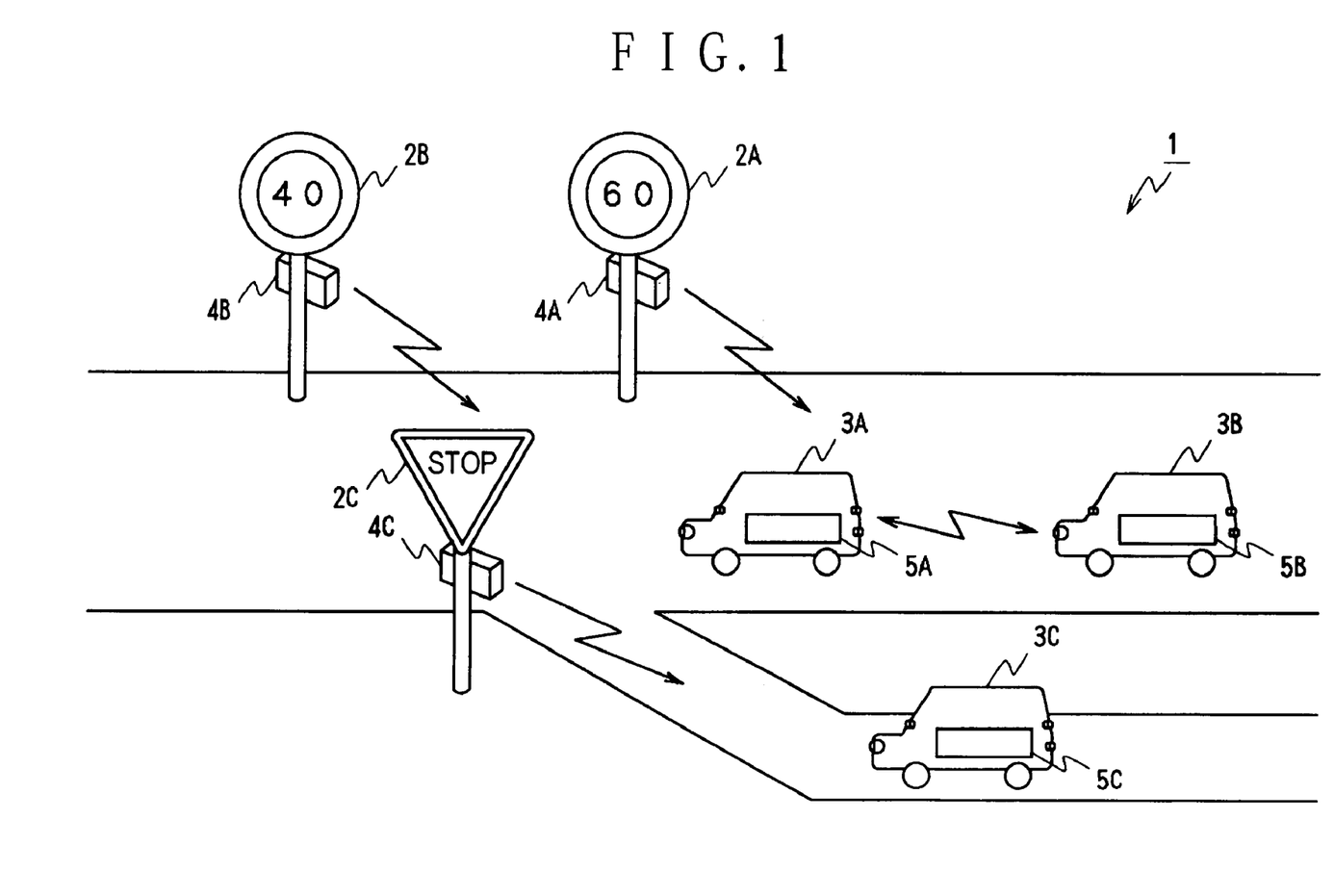
FIG. 1 is a block diagram showing a traffic control system according to an embodiment of the present invention.

FIG. 1 is a block diagram showing a traffic control system according to the embodiment of the present invention. This traffic control system 1 enables controlling of vehicles 3A, 3B and 3C traveling on respective roads by means of optical communication equipment installed in a road sign such as road signs 2A, 2B indicating a maximum speed limit, and 2C indicating a stop sign or the like. According to this traffic control system 1, for controlling of the vehicles 3A to 3C by use of these road signs 2A to 2C, an inter-vehicle communication system based on optical communication is utilized by the vehicles 3A to 3C, thereby enabling to control the traveling of vehicles easily and reliably even in such a place where a plurality of roads intersect in complication.

Figure 2:
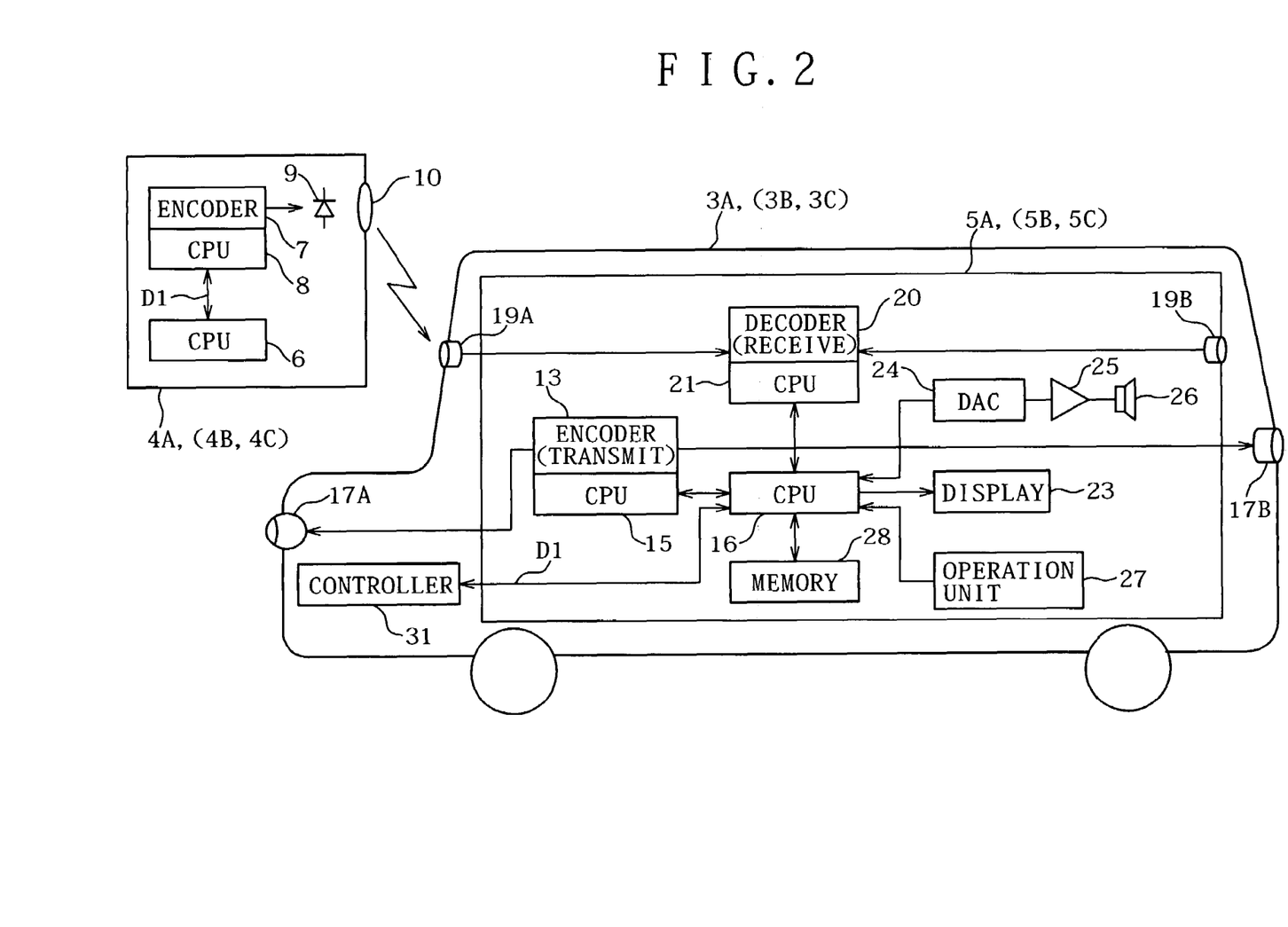
FIG. 2 is a block diagram showing optical communication equipment and inter-vehicle communication equipment according to the traffic control system of FIG. 1.

FIG. 2 is a block diagram showing optical communication equipment 4A to 4C to be installed in the respective road signs 2A to 2C, and inter-vehicle communication equipment 5A to 5C to be installed in the respective vehicles 3A to 3C. The optical communication equipment 4A to 4C repeatedly transmits information D1 of versatile traffic regulations according to the road signs 2A to 2C having the optical communication equipment 4A to 4C therein by optical communication pertaining to the inter-vehicle communication. The optical communication equipment 4A (FIG. 1) installed in the road sign 2A showing the maximum speed limit of 60 km/h transmits information D1 of traffic regulation indicating the maximum speed limit of 60 km/h via optical communication. On the other hand, the optical communication equipment 4B installed in the road sign 2B showing the maximum speed limit of 40 km/h transmits information D1 of the traffic regulation indicating the maximum speed limit of 40 km/h via optical communication. Further, the optical communication equipment 4C installed in the road sign 2C showing a stop sign transmits information D1 of the traffic regulation instructing to stop via optical communication.

By way of example, because the respective optical communication equipment 4A to 4C have a same construction except that information D1 of a traffic regulation differs therebetween, in the following description, only an arrangement of the optical communication equipment 4A will be described omitting duplication of descriptions as to the optical communication equipment 4B and 4C. Likewise, because the respective inter-vehicle communication equipment 5A to 5C have a similar arrangement, only the inter-vehicle communication equipment 5A will be described omitting duplication of descriptions of the inter vehicle communication equipment 5B and 5C.

In the optical communication equipment 4A, by executing a program stored in a memory which is not shown, a central processing unit (CPU) 6 controls operation of this optical communication equipment 4A so as to output information D1 of a traffic regulation corresponding thereto to an encoder 7. By processing of a built-in CPU 8 under the control of the CPU 6, the encoder 7 attaches a category ID which is an ID code for identifying the information from the optical communication equipment 4A being the information D1 of traffic regulation, a sender's ID which is an ID code for identifying a sender, an error checking/correction code, to the information D1 of a traffic regulation to be outputted from the CPU 6, then after converting them into a serial data string, it executes a modulation processing suitable for optical communication. Further, after adding a guide pulse for use in set up of timing to the serial data string obtained as a result of this modulation processing, a light emitter 9 is activated.

The light emitter 9 which is a light emitter for emitting a communication light used in inter-vehicle communication is formed, for example, of a high intensity light emitting diode capable of emitting visible or infrared beams of light. This light emitter 9 is flashed as operated by the encoder 7 so as to emit a communication light, and this communication light is sent via a predetermined optical system 10. According to this optical communication equipment 4A, by adjusting a relative position between the light emitter 9 and the optical system 10 as well as astigmatism in the optical system 10, it is enabled to transmit a communication light emitted from the light emitter 9 having a predetermined spread and directivity so that the communication (transmitted) light is receivable only in a particular lane or zone of the road to be covered by the road sign 2A installing the optical communication equipment 4A so as to be able to acquire the information D1 of a traffic regulation.

Thereby, according to the optical communication equipment 4A-4C, as shown in FIG. 1, even if it is installed in the road sign 2C showing a stop sign located at a side road adjacent to a main road and obliquely approaching thereto, it sends out a communication light in such a manner as is not receivable by the vehicles 3A, 3B traveling on the main road, but is receivable only by the vehicle 3C running on the side road, thereby ensuring for the vehicle 3C on the side road to be notified of the information D1 of the traffic regulation requesting to stop.

On the other hand, the inter-vehicle communication equipment 5A-5B to be installed in the respective vehicles 3A to 3C is optical communication equipment to be involved in inter-vehicle communication for transmitting/receiving messages and the like with other vehicles by inter-vehicle communication, and also for controlling the traveling of the vehicle on the basis of information D1 of a traffic regulation received from the optical communication equipment 4A to 4C.

In the inter-vehicle communication equipment 5A, under the control of a built-in CPU 15, an encoder 13 modulates output data from a CPU 16, and in accordance with a modulation output obtained as a consequence, light emitters 17A and 17B mounted on front and rear sides of the vehicle 3A are caused to flash, thereby enabling to send a message or the like toward vehicles traveling in front thereof or following thereto. In this exemplary embodiment, these light emitters 17A, 17B may be, for example, high brightness light emitting diodes applied to lamps of a headlight, a tail lamp of the vehicle 3A or such one attached to a bumper of the vehicle 3A, for sending out a communication light according to optical communication in the form of a visible light or infrared beams.

More specifically, after the encoder 13 attaches an addressee ID which is an ID code for identifying an addressee, a sender's ID which is an ID code for identifying a sender, an error checking/correction code and the like to the information message, and after converting them into a serial data string, the encoder 13 modulates this serial data string using a method suitable for optical communication. Further, after attaching a guide pulse for use in a set-up of timing to a serial data string obtained as a result of modulation, it causes the light emitters 17A, 17B to flicker accordingly. Thereby, in this traffic control system 1, the information D1 of a traffic regulation is transmitted from the optical communication equipment 4A through 4C associated with the road signs in a same format as a transmission format used in the inter-vehicle communication.

Each of light receivers 19A, 19B, which is light receiving means for receiving optical communication light pertaining to the optical communication from the front and rear directions respectively, receives a communication light transmitted from another vehicle 3A obtained by flashing light emitters 17A, 17B therein, or a communication light transmitted from the optical communication equipment 4A to 4C installed in the road signs 2A to 2C, and outputs a result of such reception to a decoder 20. In this exemplary embodiment, a two-dimensional image pick-up device using a metal oxide semiconductor (MOS) having a high speed frame rate is applied to this light receiver 19A, 19B. Thereby, high speed flashing of the light emitters 17A, 17B and/or high speed flashing of the optical communication equipment 4A to 4C are ensured to be detected reliably so that the receivers 19A and 19B can receive a message and/or the information D1 of a traffic regulation without fail. Further, by processing the result of imaging utilizing a method of object tracking, it is enabled to receive the message and the information D1 of a traffic regulation reliably even if a relative position with respect to another vehicle, or a relative position with respect to the optical communication equipment 4A to 4C may change, and still further, even if a plurality of vehicles and the optical communication equipment 4A to 4C simultaneously transmit information, their messages, the information D1 of a traffic regulation can be received, respectively.

The decoder 20, under the control of the CPU 16, allows its built-in CPU 21 to process a result of light reception outputted from the light receivers 19A, 19B to decode received data, then after error checking and correction processing thereof, notifies the data to the CPU 16. In this processing, the decoder 20 detects coordinate values of a respective light source pertaining to the communication light from the other vehicles and/or the optical communication equipment 4A to 4C on a result of imaging, identifies a respective light source pertaining to respective vehicles, the optical communication equipment 4A to 4C on the basis of the coordinate values detected, acquires a result of decoding for each light source, and notifies this result of decoding to the CPU 16 accordingly.

A display unit 23 which is comprised of, for example, a liquid crystal display displays the result of imaging by the light receivers 19A, 19B, various menu relating to the operation of the inter-vehicle communication, a message received via the inter-vehicle communication, information relating to the sender and so on under the control of the CPU 16. Thereby, in the inter-vehicle communication equipment 5A, a message sent from other vehicles via the inter-vehicle communication can be confirmed by a display on this display unit 23.

Further, the display unit 23 displays various traffic regulations concerning the road on which the vehicle is currently traveling on the basis of the information D1 of a traffic regulation acquired from the optical communication equipment 4A to 4C, and at an instruction from the CPU 16, on the result of imaging. More specifically, in a case where the maximum speed limit of the road the vehicle is now traveling is 60 km/h, this speed limit is displayed on the display unit 23. On the other hand, for example, if the information D1 of the traffic regulation pertaining to a stop sign is received, a notice to stop is displayed in conjunction. Thereby, in this inter-vehicle communication equipment 5A, a variety of information D1 of traffic regulations pertaining to the road signs can be confirmed by a display on the display panel 23.

A digital-to-analog converter (DAC) 24 applies a digital-to-analog conversion processing to voice data outputted from the CPU 16, and an amplifier circuit 25 drives a speaker 26 using an output signal from the DAC 24. In this exemplary embodiment, for voice data, the data of a message received via inter-vehicle communication is applied as such voice data described above, thereby in this inter-vehicle communication equipment 5A, it is also possible to confirm the message received via the inter-vehicle communication in a voice message.

Further, in this exemplary embodiment, voice data based on the information D1 of a traffic regulation to be received from the optical communication equipment 4A to 4C is applied as the voice data described above, thereby in the inter-vehicle communication equipment 5A, it is also possible to confirm the traffic regulation in a voice message, thereby assisting safe driving accordingly.

An operation unit 27 is composed of operating elements for accepting various operations by a user of this inter-vehicle communication equipment 5A, and a touch panel provided on a display screen of the display unit 23, and notifies the operation by the user to the CPU 16.

A memory 28 constitutes a work area of the CPU 16, and also stores and retains various data necessary for executing the processing by the CPU 16. In this exemplary embodiment, as the data necessary for the processing by the CPU 16, update information of traffic regulations based on the information D1 of traffic regulations received from the optical communication equipment 4A to 4C is adopted.

The central processing unit CPU 16 is a microcomputer for executing a preset processing program stored in recording means which is not shown here, and controls the overall operation of this inter-vehicle communication equipment 5A. That is, when the user instructs to send a message by operating the operation unit 27, the CPU 16 accepts input of this message, a transmission object. Further, after set-up of an addressee ID, a sender's ID and the like based on this input, it instructs transmission of the message to the encoder 13. Thereby, the inter-vehicle communication equipment 5A is enabled to transmit a desired message to vehicles traveling in front thereof and/or following thereto.

On the other hand, when reception of a message and/or information D1 of a traffic regulation is notified from the decoder 20, the CPU 16 acquires a result of decoding by the decoder 20. Then, the CPU 16 judges whether or not a category ID pertaining to the information D1 of a traffic regulation is set up on this result of decoding. Thereby, the CPU 16 judges if the received information is a message pertaining to inter-vehicle communication or not, and in a case the message pertains to the inter-vehicle communication, the CPU 16 allows the display unit 23 to display the message, and also it generates a voice data corresponding to the message to be outputted to the DAC 24.

Figure 3:
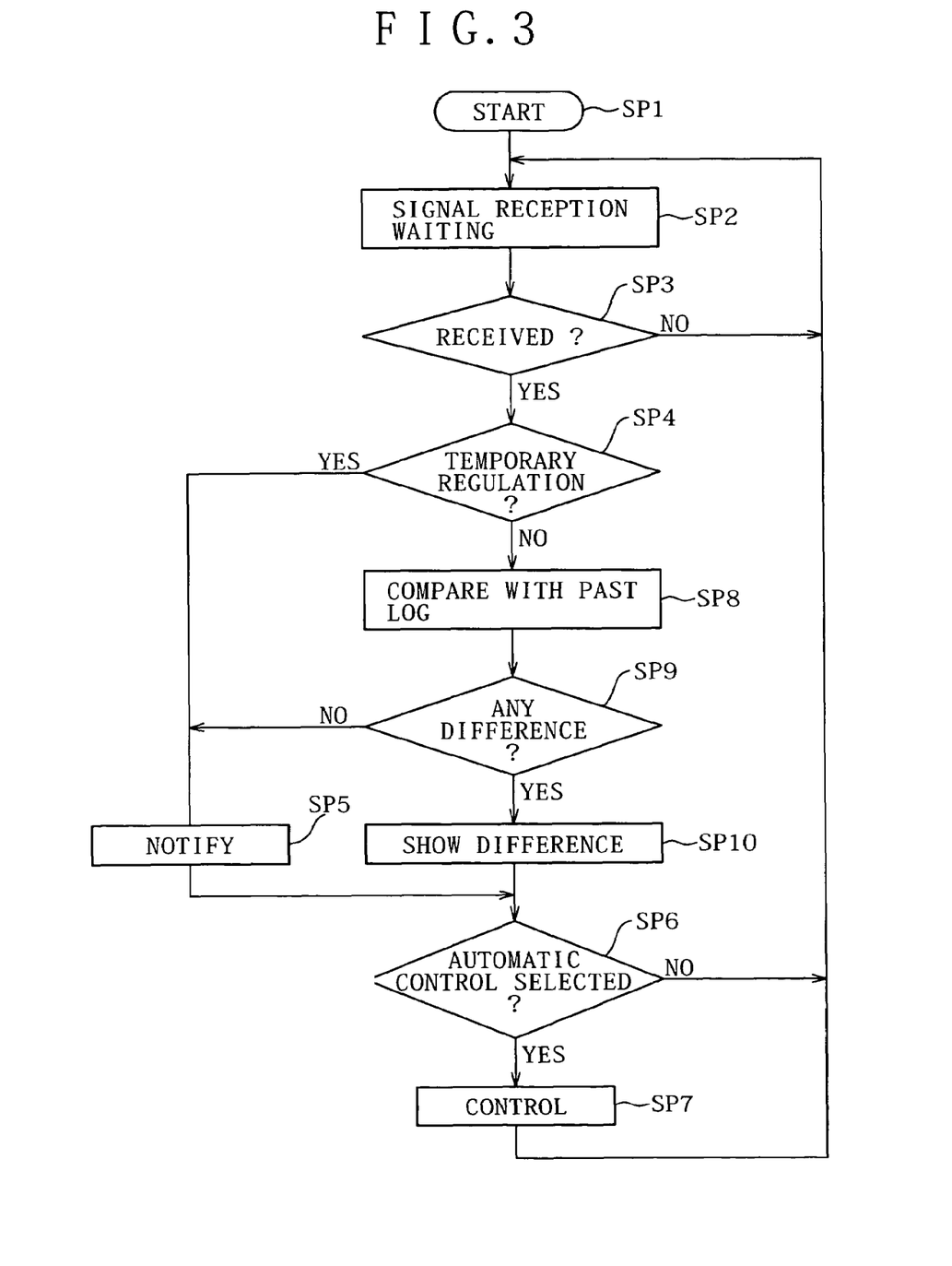
FIG. 3 is a flowchart showing processing steps of a central processing unit in the inter-vehicle communication equipment of FIG. 2.

On the other hand, in a case where the received information is the information D1 of a traffic regulation, the CPU 16 starts to control the traveling of the vehicle in accordance with this information D1 of traffic regulation by executing a process sequence shown in FIG. 3. That is, when the CPU 16 starts the process sequence pertaining to the information D1 of a traffic regulation, the step moves from SP1 to SP2 in which it waits reception of the information D1 of a traffic regulation for a predetermined period of time, then in a subsequent step SP3, the CPU 16 judges whether or not the information D1 of a traffic regulation has been received. If a negative result is obtained here, the CPU 16 returns to step SP2. Thereby, the CPU 16 repeats a process sequence of SP2-SP3-SP2 until the information D1 of a traffic regulation is received, and when the reception of the information D1 of traffic regulation is notified from the decoder 20, the step moves from SP3 to SP4.

Here, the CPU 16 judges whether or not the received information D1 of traffic regulations is a temporary regulation applicable only to the present position, indicating such as a "STOP", "DO NOT ENTER" signs or the like. If an affirmative result is obtained here, the CPU 16 moves from step SP4 to SP5 in which it notifies this traffic regulation to the user by controlling the display unit 23 to display the same, and further by synthesizing voice data to be output to the DAC 24 so as to be notified to the user in a voice message.

Subsequently, the CPU 16 moves to step SP6 in which it judges whether or not the user has selected an operation mode of automatic control. This automatic control mode is an operation mode for automatically controlling the traveling of the vehicle in accordance with the traffic regulations. If a negative result is obtained in this step SP6, the CPU 16 returns from SP6 to SP2 to wait for reception of subsequent information D1 of a traffic regulation. On the other hand, if an affirmative result is obtained in step SP6, the CPU 16 moves from step SP6 to SP7 for controlling the traveling of the vehicle by notifying the information D1 of a traffic regulation to a vehicle controller 31 (refer to FIG. 2).

Figure 4:
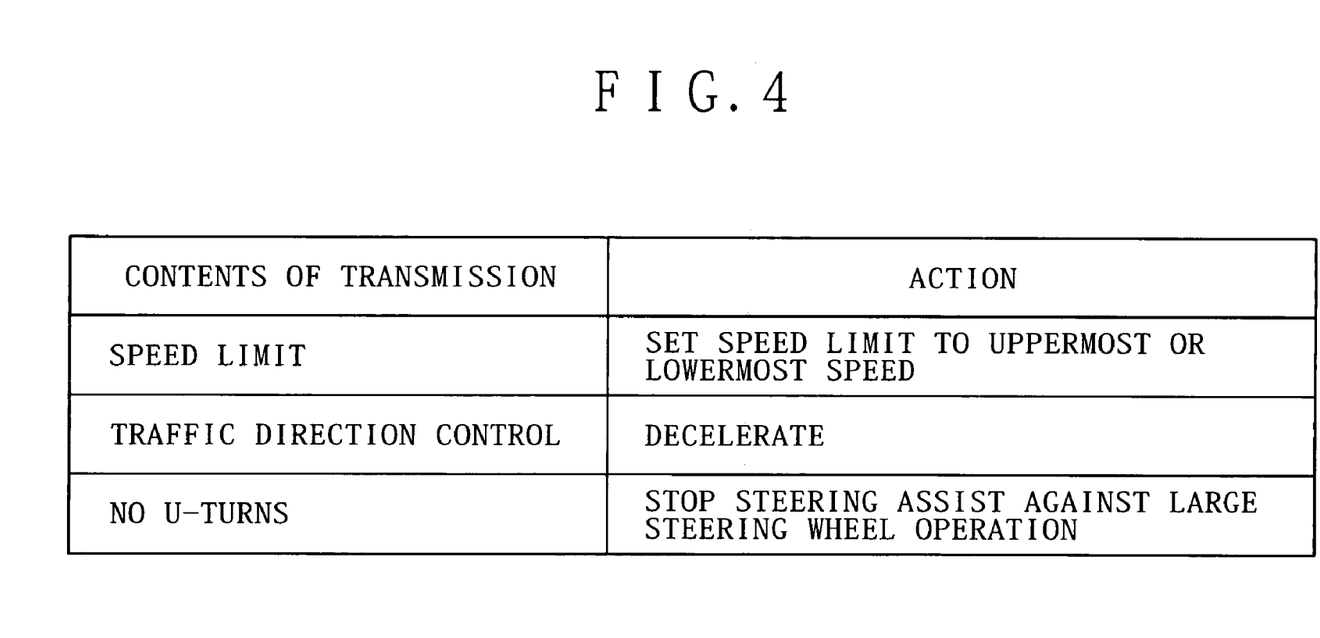
FIG. 4 is a table used for explaining the flowchart of FIG. 3.

This vehicle controller 31 is a computer for controlling the operation of the vehicle 3A, and upon notification of such information D1 of the traffic regulation, it controls the traveling of the vehicle in accordance therewith. That is, as shown in FIG. 4, if information D1 of the traffic regulation indicating the maximum speed limit or the minimum speed limit is notified from the inter-vehicle communication equipment 5A, the controller 31 sets up this maximum speed limit or the minimum speed limit as an uppermost speed or a lowermost speed so as to control the traveling speed of the vehicle not to exceed the speed limit even if the user instructs further to accelerate or decelerate by the operation of an acceleration pedal. However, it should be noted that in an emergency case for avoiding danger, at an operation by the user such as emergency braking or the like, this limit is instantly cancelled. Further, if the information D1 of the traffic regulation notified via the inter-vehicle communication equipment 5A is a direction control regulation, and the present lane the vehicle is now traveling is against this direction control regulation, the controller causes the speed of the vehicle to decelerate. Still further, as for the information D1 of traffic regulation indicating "NO U-TURN", it stops a steering assist function against a large steering wheel operation trying a U-turn thereby making it harder to operate the steering wheel.

Thereby, while it relies on the user's operation as for a final operation of the vehicle, the controller 31 controls the traveling of the vehicle in accordance with the information D1 of the traffic regulation notified from the inter-vehicle communication equipment 5A. Thereby, for example, as shown in FIG. 1, when the vehicle 3C approaches a point where the road sign 2C indicating "STOP" is installed, the speed of the vehicle 3C is decelerated gradually, and thus it is prevented to rush into a main road ignoring the stop sign 2C.

By notifying the information D1 of the traffic regulation to the controller 31 and at the completion of the control of the traveling of the vehicle as described above, the CPU 16 returns to step SP2 to wait for reception of subsequent information D1 of a traffic regulation.

Conversely, if a negative result is obtained in step SP4, the CPU 16 moves from step SP4 to SP6 in which relevant information D1 of a traffic regulation already stored in the memory 28 and the information D1 of a traffic regulation currently received are checked and compared.

As for the road signs, there are various road signs including such ones that show traffic regulations applicable to a predetermined travel zone as the signs 2A, 2B indicating the speed limit shown in FIG. 1. In such traffic regulation signs, a condition of the traffic regulation changes on the course of traveling of the vehicle. Therefore, the CPU 16 records and stores information D1 relating to such traffic regulations in the memory 28, and detects any difference in the conditions of the regulations by checking with the records in the memory 28. Further, when the condition of regulations has changed as described above, it is notified to the user to this effect.

That is, by checking with the records already stored in the memory 28 in step SP8, the CPU 16 judges whether or not the condition of the traffic regulation has changed in a subsequent step SP9. If a negative result is obtained here, it moves from step SP9 to SP5, and notifies the received information D1 of the traffic regulation to the user. By way of example, in this case because the condition of the regulation has not changed from the previous one, the CPU 16 allows the information D1 of the traffic regulation to be notified to the user only by a display on the display 23, and omits its notification by a voice message so as to prevent giving annoyance to a passenger.

After having notified the information D1 of the traffic regulation to the user as described above, the CPU 16 moves from step SP5 to SP6. In the case where the automatic control mode is set up, after notifying this new information D1 of the traffic regulation to the vehicle controller 31, it returns to step SP2.

On the other hand, when the condition of the regulation has changed, i.e. when an affirmative result is obtained in step SP9, the CPU 16 moves from step SP9 to SP10. Here, after updating a corresponding record in the memory 28, the CPU 16 notifies the received information D1 of traffic regulation to the user in such a manner that the user is ensured to recognize its difference in the conditions of the regulations. More specifically, the CPU 16 ensures for the contents of the change in the conditions of the traffic regulations to be notified certainly to the user, i.e., from what condition to what condition it has changed, by displaying on the display panel 23 as well as annunciating in a voice message from the speaker.

By referring to FIG. 1, for example, when a vehicle just has passed the road sign 2A indicating the speed limit of 60 km/h, and receives another information D1 of the traffic regulation pertaining to the road sign 2B indicating the speed limit of 40 km/h, the CPU 16 notifies a change in the conditions of traffic regulations to the user by announcing "Speed limit has changed from 60 km/h to 40 km/h". And also, it notifies the change in the conditions of the traffic regulations by displaying "Speed limit 60->40", for example. By the way, in the above case, it may be arranged to notify a differential between the conditions thereof to the user by announcing and/or displaying, for example, "Speed limit is decreased by 20 km/h".

When the information D1 of a traffic regulation is notified to the user as described above so that the change in the conditions of the traffic regulations becomes distinctly understandable to the user, the CPU 16 moves from the step SP10 to SP6.

(2) Operation of the Embodiment

In the traffic control system 1 having the aforementioned arrangement (refer to FIGS. 1 and 2), if a user in the respective vehicles 3A to 3C instructs transmission of a message via the inter-vehicle communication, the light emitters 17A, 17B are caused to flash operated by the encoder 13 which is under control of the CPU 16, thereby enabling to transmit a message via optical communication according to the inter-vehicle communication toward the vehicles traveling in front thereof and following thereto. Further, when a communication light pertaining to the optical communication transmitted as described above is received by the light receiver 19A, 19B installed in the vehicles 3A to 3C, its message is decoded by processing of the received light by the decoder 20, then this message is notified to the user by displaying on the display 23 and/or in a voice message from the speaker 26. Thereby, according to this traffic control system 1, an inter-vehicle communication system is comprised of the inter-vehicle communication equipment 5A to 5C installed in the vehicles 3A to 3C so as to be able to establish communication between these vehicles 3A to 3C and exchange messages therebetween.

In this traffic control system 1, the respective optical communication equipment 4A to 4C are installed in the respective road signs 2A to 2C, and the respective information D1 of the traffic regulation pertaining to the respective road signs 2A to 2C is transmitted from these optical communication equipment 4A to 4C. In this traffic control system 1, transmission of the information D1 of the traffic regulation is carried out using a communication light pertaining to the optical communication. Thereby, it becomes possible to transmit the information D1 of the traffic regulation directing to a specific vehicle, for example, traveling on a specific lane on a road having a plurality of lanes in such a manner that no other vehicle traveling on the other lanes receives it which is enabled by sending communication light with very sharp directivity. Further, for example, even in such a location where a plurality of roads intersect in complication as in an urban city or the like, it is possible to transmit the information D1 of the traffic regulation which is receivable only by a vehicle approaching the road sign indicating to stop, thereby enabling for the traveling of the vehicle to be controlled even in such a location in an urban city or the like where a plurality of roads intersect in complication.

Further, when transmitting the information D1 of the traffic regulation from the optical communication equipment 4A-4C, it is transmitted so as to be receivable by the inter-vehicle communication equipment 5A-5C, and in conformance with an inter-vehicle communication format, thereby enabling to notify the information D1 of the traffic regulation by effectively utilizing the arrangement of the inter-vehicle communication system, and thereby facilitating to construct the system in a simpler configuration accordingly.

That is, in the traffic control system 1, the communication light carrying the information D1 of the traffic regulation transmitted from the optical communication equipment 4A-4C is received, likewise the message pertaining to the inter-vehicle communication, by the light receivers 19A, 19B installed in the vehicles 3A-3C, the information D1 of the traffic regulation is decoded by processing the result of reception thereof in the decoder 20, then, this information D1 is notified to the user by being displayed on the display unit 23, and by annunciation in a voice message from the speaker 26. Further, it is notified to the vehicle controller 31 by the CPU 16 so that the vehicle controller 31 controls such that, for example, when the vehicle is approaching a stop sign, the vehicle decelerates adequately in advance. Still further, when the vehicle traverses crossing the road signs 2A, 2B indicating the speed limits, the maximum speeds of the vehicle are set up respectively at the speeds of the road signs 2A, 2B indicating respective speed limits, thereby enabling to control the traveling of the vehicle accordingly.

Thereby, at the time when receiving and processing the information D1 of the traffic regulation, in the inter-vehicle communication equipment 5A-5C, front and rear views are imaged by image pick-up means, and respective light sources pertaining to the communication light from the other vehicles as well as from the optical communication equipment 4A-4C are identified on the result of imaging, then for each of the respective light sources identified, a respective decoded result is acquired. Therefore, even in such a case where messages and information D1 of traffic regulation are transmitted simultaneously, it is enabled to receive these messages and information D1 of traffic regulation reliably without interference or a cross talk experienced in radio communication. Therefore, according to this traffic control system 1, it is possible to install the optical communication equipment 4A to 4C in the road signs or the like easily and at discretion as required, thereby enabling to construct the system flexibly in a simpler arrangement.

Conversely, on the side of the inter-vehicle communication equipment 5A-5C, when the information D1 of the traffic regulation is received, in addition to the notification thereof to the controller 31, it is notified to the user by display and also by a voice message. Thereby, an overlooking of the road signs by the user is prevented assisting safe driving. Further, in the event of this notification, for example, in a case where a respective condition of traffic regulations such as a speed limit changes variously from zone to zone in the course of traveling on the road, the contents of its change is notified to the user, i.e., from what regulation to what regulation it has changed, thereby ensuring that the user will recognize the traffic regulations without fail.

(3) Advantages of the Embodiment

According to the constitution of the invention described above, by enabling to notify the information of traffic regulations utilizing the optical communication pertaining to the inter-vehicle communication system, it becomes possible to control the traveling of the vehicle easily and reliably even in such a place where a plurality of roads intersect in complication as in an urban city or the like.

That is, by enabling for the optical communication equipment to transmit the information of traffic regulations by optical communication to be receivable by the inter-vehicle communication equipment, it becomes possible to transmit the information of traffic regulations easily and reliably by effectively utilizing the inter-vehicle communication system, thereby ensuring to control the traveling of the vehicle easily and reliably even in the place where a plurality of roads intersect in complication such as in an urban city or the like.

Further, because the optical communication equipment is installed in the road signs, it is enabled to notify the information of traffic regulations to the user corresponding to the traffic regulations of the road signs simultaneously, thereby effectively avoiding confusion that may occur to the user when the traffic regulation is notified separately.

Conversely, on the side of the optical communication equipment installed in the vehicle, according to the processing of the CPU as the control means, as for a communication light transmitted from other equipment of the similar type installed in the other vehicles, the result of decoding thereof is notified to the user, and as for the information of traffic regulations, it is supplied for controlling the traveling of the vehicle in accordance therewith, thereby ensuring for the traveling of the vehicle to be controlled easily and reliably by effectively utilizing the inter-vehicle communication system.

Further, having enabled to notify the aforementioned information of traffic regulations to the user as described above, in the case where the condition of the traffic regulations changes, the contents of the change is also notified to the user, thereby enabling the user to recognize the traffic regulation clearly without fail.

Preferred Embodiment 2

Although the present invention has been described heretofore by way of example of the embodiment as applied to the transmission of the information of a traffic regulation by utilizing the optical communication equipment installed in the road signs indicating the speed limit, stop signs or the like, it is not limited thereto, and many other applications, variations, and combinations may be considered, for example, including such cases for transmitting information of a traffic regulation such as "NO PARKING", or information of traffic regulations according to a warning sign, a guide sign or the like. By the way, as for the information of the traffic regulation pertaining to such guide signs, it may be considered to update the information corresponding thereto stored in car navigation equipment simultaneously.

What is claimed is:

1. An optical communication system for controlling traveling of a vehicle comprising:
   inter-vehicle communication equipment installed in a first vehicle for transmitting and/or receiving various information to and from similar equipment installed in other vehicles via optical communication, and
   a vehicle controller for automatically controlling the operation of the first vehicle,
   wherein information of traffic regulations is transmitted to the vehicle via the optical communication so as to be receivable by said inter-vehicle communication equipment, and
   wherein the vehicle controller, on the condition that a user has selected an automated control mode, automatically controls the operation of the vehicle to be in accordance with said received traffic regulations.

2. The optical communication equipment according to claim 1, wherein said optical communication equipment is installed in a road sign.

3. The optical communication system of claim 1, wherein:
   on the condition that the received traffic regulations include a speed limitation, the vehicle controller prevents the vehicle from exceeding the speed limit when the user operates an acceleration pedal.

4. The optical communication system of claim 1, wherein:
   on the condition that the received traffic regulations include a prohibition on U-turns, the vehicle controller causes a steering wheel to become harder to operate when the user attempts to perform a U-turn.

5. Optical communication equipment installed in a vehicle, comprising:
   a light emitter for transmitting a communication light used in optical communication;
   an encoder for operating said light emitter;
   a light receiver for receiving said communication light from similar equipment installed in other vehicles or road signs;
   a decoder for decoding a light reception result in said light receiver;
   an operation unit for accepting operations by a user of the vehicle; and
   a controller for processing a decoding result by said decoder and controlling operation of said encoder, wherein:
   said controller controls said encoder in response to an operation by a user to transmit a desired message via said optical communication, notifies the user of the decoding result in a case where the decoding result by said decoder is the one from said similar equipment installed in other vehicles via optical communication, and controls the vehicle in accordance with the decoding result in a case where the decoding result by said decoder is related to information of traffic regulation.

6. The optical communication equipment according to claim 5, wherein said controller notifies the user of the information of said traffic regulation and, in a case where a condition defined by said traffic regulation changes, notifies the user of contents of the change.

7. The optical communication equipment of claim 5, wherein:
   in a case where the decoding result by said decoder is related to a speed limitation, said controller prevents the vehicle from exceeding the speed limitation when the user operates an acceleration pedal.

8. The optical communication equipment of claim 5, wherein:
   in a case where the decoding result by said decoder is related to a prohibition on U-turns, said controller causes a steering wheel to become harder to operate when the user attempts to perform a U-turn.

9. A vehicle control method for controlling traveling of a vehicle comprising:
   a first step of installing inter-vehicle communication equipment in the vehicle for transmitting/receiving various information to and from similar equipment installed in other vehicles via optical communication
   a second step of transmitting information of traffic regulations via the optical communication so as to be receivable by said inter-vehicle communication equipment, and
   a third step of automatically controlling the operation of the vehicle, via a vehicle controller apparatus, to be in accordance with said received traffic regulations.

10. The vehicle control method according to claim 9, wherein said information of traffic regulation is transmitted from a road sign.

11. The vehicle control method of claim 9, wherein:
    the third step further comprises, on the condition that the received traffic regulations include a speed limitation, the vehicle controller apparatus preventing the vehicle from exceeding the speed limit when the user operates an acceleration pedal.

12. The vehicle control method of claim 9, wherein:
    the third step further comprises, on the condition that the received traffic regulations include a prohibition on U-turns, the vehicle controller apparatus causing a steering wheel to become harder to operate when the user attempts to perform a U-turn.

* * * * *